May 25, 1954  T. P. MELOY  2,679,609
RADIATION MEASURING DEVICE
Filed Nov. 15, 1949
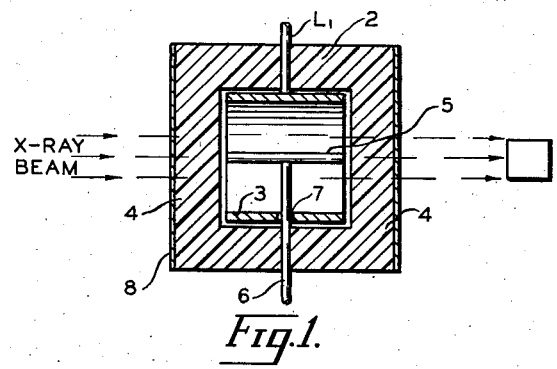
Fig.1.
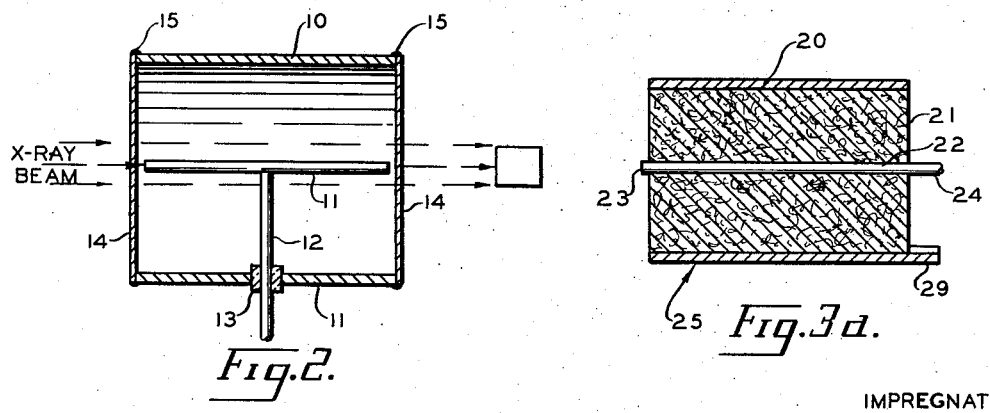
Fig.2.          Fig.3a.
IMPREGNATED WITH X-RAY FILTER METAL
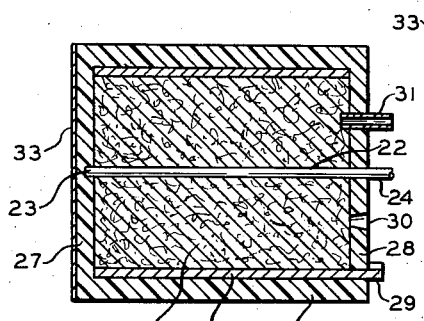   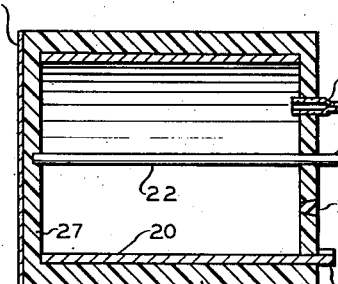   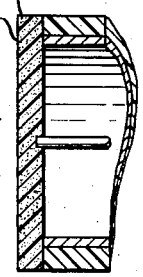
Fig.3b.          Fig.3c.          Fig.4.
INVENTOR.
THOMAS P. MELOY
BY Hyman Hurwitz
ATTORNEY Patented May 25, 1954

2,679,609

UNITED STATES PATENT OFFICE 2,679,609

RADIATION MEASURING DEVICE

Thomas P. Meloy, Cambridge, Mass., assignor to Melpar, Inc., Alexandria, Va.

Application November 15, 1949, Serial No. 127,322

6 Claims. (Cl. 313—93)

1

The present invention relates generally to improved radiation measuring devices, and more particularly to ionization chambers and Geiger-Müller counters which includes filters as integral parts thereof, and also to instruments of the above character which are constructed in metal envelopes constituting one electrode of the instrument, and in other novel ways.

In the utilization of X-rays both for therapeutic and in diffraction studies, as well as for other uses, it is desired to irradiate some object with a homogeneous beam of X-rays of known intensity. It is conventional, accordingly, to filter the X-rays as they are produced by the X-ray generator, to remove undesired frequency components, and to measure the intensity of filtered rays, usually by a Geiger-Müller counter, although some operators prefer the ionization chamber or the photocell multiplier, for this purpose.

It is the usual practice to construct ionization chambers and Geiger-Müller counters as units distinct from the filters employed in conjunction therewith.

It is an object of the present invention to provide novel Geiger-Müller counters and ionization chambers having an envelope constructed in part or wholly of X-ray filter material, whereby the use of a separate filter may be avoided.

It is a further object of the invention to provide radiation measuring devices of novel construction, as well as novel methods of fabrication of such devices.

The above and still further objects, features and advantages of the invention will become evident upon consideration of the following detailed description of various embodiments thereof, especially when taken in conjunction with the accompanying drawings, wherein:

Figure 1 is a view in longitudinal cross-section of a composite Geiger-Müller counter and filter arranged in accordance with the invention;

Figure 2 is a view in longitudinal cross-section of a modification of the system of Figure 1;

Figures 3a–3c, inclusive, show separate stages of construction of a radiation chamber fabricated in accordance with my invention; and, Figure 4 illustrates in section an X-ray filter capable of employment in the practice of my invention.

It will be realized by those skilled in the art that the mechanical features of a Geiger counter and of an ionization chamber may be similar, the differences between the instruments inhering primarily in the gases and gas pressures utilized, the voltages utilized, and the like, and in the general mode of operation. The Geiger counter is arranged to accomplish repeated discrete discharges in response to radiation, while the ionization chamber is arranged to measure a steady relatively small ionization current.

I have illustrated my invention as applied to ionization chambers, with the full realization, however, that the invention may be applied similarly to Geiger-Müller counters, if desired, and is, in fact, of quite broad application in the field of radiation measurement.

Referring now more specifically to Figure 1 of the drawings, the reference numeral 1 denotes generally an ionization chamber, which may comprise an envelope 2 of organic material, such as Bakelite or Lucite, or the like.

The envelope 2 contains therein a small cylinder 3, of metal such as copper, which is supported with respect to the parallel end walls 4 of the envelope 2, the latter being generally of circular transverse cross-section, by means of a lead $L_1$.

Disposed axially of the metallic cylinder 3 is a thin rod 5, fabricated of metal, and supported by a lead 6 which passes through an aperture 7 in cylinder 2, and through the cylindrical wall of the envelope 2, which forms a support therefor.

An X-ray beam may impinge on either of the walls 4, perpendicularly thereto, and pass through the chamber, and thence to an object to be irradiated.

On one or both of the walls 4 is a thin coating 8 of metal suitable for filtering purposes. For example, in spectrographic work, when the X-ray anode is fabricated of copper the filter material should be of nickel. For tube targets of molybdenum, cobalt or iron, respectively, the filter material should be of zirconium, iron or manganese, respectively. The filter material should be extremely thin, say .001 inch in the case of nickel, and may be applied in the form of foil or by vacuum distillation of the metal on the base plates 4.

The ionization chamber 1, in accordance with the invention, serves then to measure beam intensity of a beam of known characteristics, including in a single instrument the device which determines the characteristics of the X-ray beam, and the measuring device itself.

A modification of the system of Figure 1 is illustrated in Figure 2 of the drawings, wherein the envelope 2 is dispensed with, and the metallic cylindrical electrode 3 itself forms a wall of the envelope, being relatively thick as shown at 10 in Figure 2 of the accompanying drawings.

The central axial electrode 11 is mounted on a conducting support 12 which passes through the wall 10 via an insulator 13 supported in the wall 10. The filter walls 14 are then secured, as by brazed, solder or welded joints 15, to the open ends of the cylindrical electrode 10, to enclose the latter.

An X-ray beam passing parallel to the axis of the cylindrical electrode 10, and interiorly thereof, passes through the filter walls 14 on its way to the irradiated object 15, and the latter is accordingly irradiated by an X-ray beam of known intensity and constitution, by virtue of the sole operation of the ionization chamber.

While the invention above described may be fabricated in various ways, known to those skilled in the pertinent art, I have devised a novel system of fabricating ionization chambers, or Geiger-Müller counters, at relatively low cost, and with extreme efficiency. The novel system of fabrication results, further, in a novel Geiger counter, in accordance with the invention, which is extremely compact and non-frangible.

Referring now to Figure 3a of the drawings, I have illustrated a first step in the system of fabrication referred to hereinabove. In this step an open-ended cylinder 20 of copper is filled with wax 21, and an elongated metallic rod 22 passed axially through the wax 21 before it hardens. The ends of the rod are arranged to extend beyond the ends of the wax cylinder thus formed, for a short distance at one end, as at 23, and for a considerable distance at the other end, as at 24.

The entire assembly illustrated in Figure 3a, and which may be identified by the reference numeral 25, may now be coated with a suitable organic plastic, in a mold (see Figure 3b) the plastic forming a cylindrical wall 26 surrounding the copper cylinder 20 and the wax plug 21, and the plastic forming further an end wall 27 which covers the end 23 of the rod 22, and a further end wall 28 through which protrudes the end 24 of the rod 22, and a lug 29 secured to or formed integrally with the cylinder 20. The wall 28 may further be formed to include an opening 30 extending therethrough to the wax, and a small tube 31 suitable for transfer of gas.

The plastic casing is hardened, and thereafter heated, to melt the wax 21, which is then disposed of via the opening 30. The latter is then sealed by means of a plug 32. Suitable gas at suitable pressure is then introduced via the tube 31 and the latter sealed off.

The cylinder 20 is then supported by and integral with the outer casing 26, and the axial rod 22 is supported in the end walls 27 and 28 of the plastic cylinder, providing a rigid, sturdy construction.

A filter 33 may be cemented to the wall 27, or deposited thereon, in the manner described in connection with the exposition of the systems of Figures 1 and 2, the final product being illustrated in Figure 3c.

Figure 4 represents a novel mode of filter construction, and one which is peculiarly adapted to inclusion in radiation measuring apparatus constructed in accordance with the invention.

It is well known that powdered metal may be included in and evenly dispersed throughout plastic material. Many types of radiation filters, on the other hand, may be required to be fabricated of metals which are difficult and expensive to form into thin foil, or to distill onto backing material. In such case the metal of the filter in the form of powder may be dispersed throughout a plastic binder, and the latter employed as a filter, providing essentially a sturdy and economical arrangement. In the arrangements shown in Figures 1 and 3a–3c, inclusive, then, the above described expedient may be resorted to to provide radiation filtering action, by impregnating the walls 4 of the cylinder 2, or the walls 27 and 28, of the cylinder 26, with filtering metal. The total amount of metal used, in relation to the mass of the plastic will determine the filtering efficiency and the attenuation introduced, and this may readily be varied over an extremely wide range of values, from values less than is attainable by even the most fragile foils to those equivalent almost to solid block of metal. Further, composite filters may be readily constructed, which contain a plurality of filtering materials in any desired proportions.

While I have described various specific embodiments of the invention, it will be clear that variations thereof may be resorted to without departing from the true spirit and scope of the invention as defined in the appended claims.

What I claim and desire to secure by Letters Patent of the United States is:

1. A radiation measuring device comprising a hollow gas tight cylindrical resinous casting of unitary construction consisting of opposing end walls and a cylindrical wall joining said end walls, a hollow generally cylindrical metallic electrode having open ends disposed within said casting and supported thereby, a metallic rod electrode located co-axially of said hollow metallic electrode and supported solely by at least one of said end walls as an embedment directly therein, and X-ray filter material capable of passing X-rays of one frequency of an X-ray spectrum substantially without attenuation and of radically attenuating X-rays of other frequencies contained in said X-ray spectrum, said X-ray filter material disposed integrally with at least one of said walls.

2. The combination in accordance with claim 1 wherein said X-ray filter material is coated on said at least one of said walls.

3. The combination in accordance with claim 1 wherein said X-ray filter material is dispersed throughout at least one of said walls, said X-ray filter material consisting of discrete metallic particles.

4. A frequency selective X-ray measuring device for selectively measuring the intensity of X-rays of one frequency only of those present in an X-ray spectrum containing a plurality of different frequencies, said device comprising a hollow gas tight chamber of unitary construction, having resinous polymolecular integrally cast walls, a pair of spaced electrodes disposed within said chamber and supported by the walls thereof, and X-ray filter material capable of passing X-rays of said one frequency of said X-ray spectrum substantially without attenuation and of radically attenuating X-rays of other frequencies contained in said X-ray spectrum, said X-ray filter material disposed integrally with at least one of said walls.

5. The combination in accordance with claim 4 wherein said X-ray filter material is coated on at least one of said walls.

6. The combination in accordance with claim 4 wherein said X-ray filter material is dispersed throughout at least one of said walls, said X-ray filter material consisting of discrete metallic particles.

References Cited in the file of this patent

UNITED STATES PATENTS

| Number | Name | Date |
|---|---|---|
| 1,624,443 | St. John | Apr. 12, 1927 |
| 2,105,704 | Shippy et al. | Jan. 18, 1938 |
| 2,135,380 | Benge | Nov. 1, 1938 |
| 2,197,453 | Hassler | Apr. 16, 1940 |
| 2,383,478 | Friedman et al. | Aug. 28, 1945 |
| 2,403,794 | Goldrick et al. | July 9, 1946 |
| 2,405,572 | Friedman | Aug. 13, 1946 |
| 2,479,271 | Shonka | Aug. 16, 1949 |
| 2,479,600 | Borkowski | Aug. 23, 1949 |
| 2,489,627 | Dudley | Nov. 29, 1949 |
| 2,491,220 | Segre et al. | Dec. 13, 1949 |

FOREIGN PATENTS

| Number | Country | Date |
|---|---|---|
| 334,194 | Germany | Mar. 9, 1921 |